United States Patent Office 3,672,919
Patented June 27, 1972

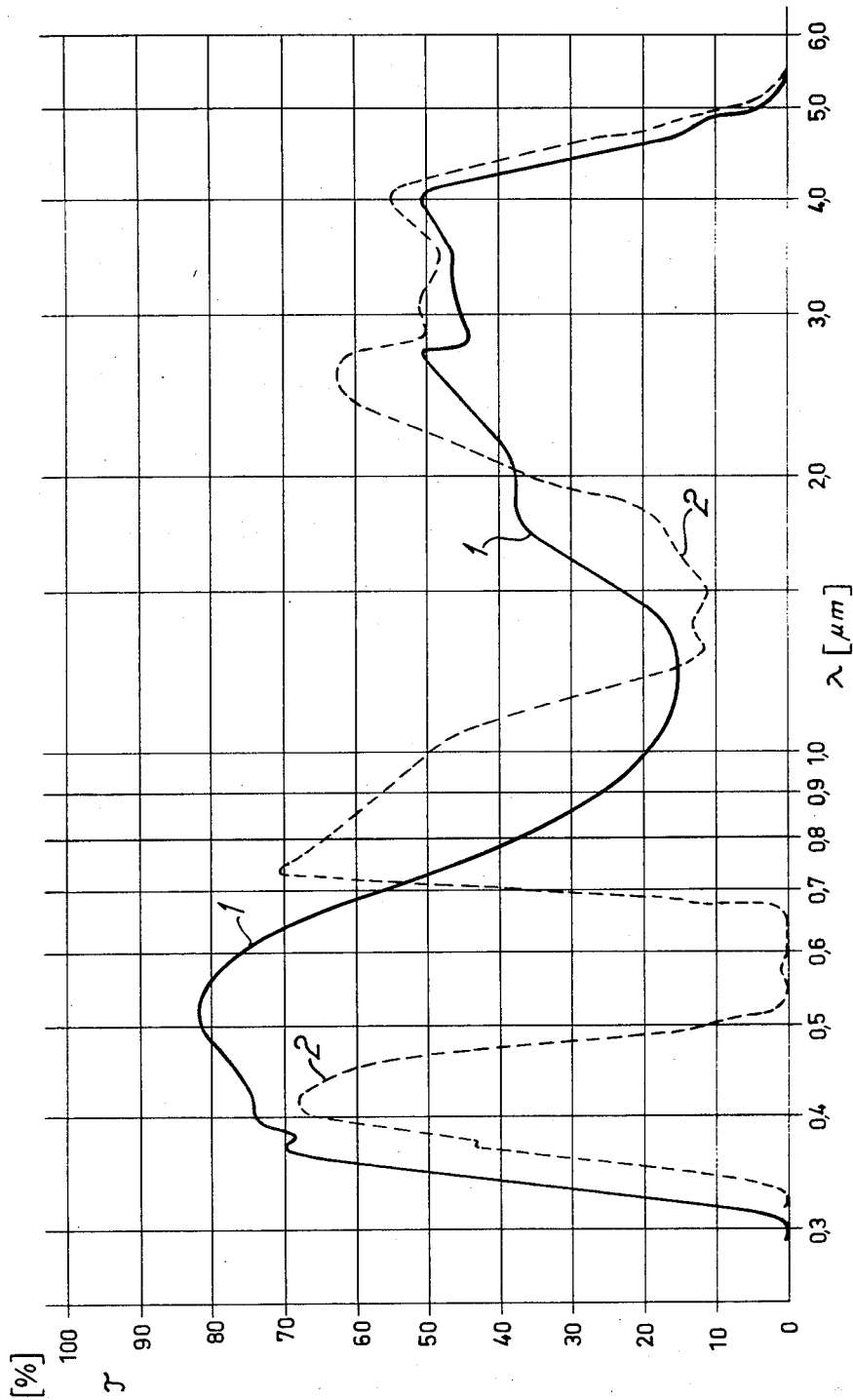

3,672,919
SEALING GLASS HAVING HIGH ABSORPTION
OF INFRARED RADIATION
Werner Sack, Mainz-Gonsenheim, Germany, assignor to
Jenaer Glaswerk Schott & Gen., Mainz, Germany
Filed Sept. 19, 1969, Ser. No. 859,594
Claims priority, application Germany, Sept. 25, 1968,
P 17 96 232.2
Int. Cl. C03c 3/04, 3/10, 3/08
U.S. Cl. 106—52
14 Claims

ABSTRACT OF THE DISCLOSURE

Glass which is heat absorbing and electrically highly insulating and suitable for sealing of elements of nickel-chromium-iron and nickel-manganese-iron alloys containing iron (II) oxide in an amount providing high infrared absorption at 1–2 µm. and less than 20% by weight of PbO.

---

The instant invention relates to compositions of sealing glasses suitable in particular for the sealing in of elements made of nickel-manganese-iron and nickel-chromium-iron alloys.

The sealing in of metallic parts within a glass as is commonly practiced in the electronics industry in, for example, making vacuum tubes, can take place by the application of any heating method. In view of the fact that, upon heating with a gas flame, flue gases are occluded in the glass jacket, preference has increasingly been given to the use of radiant heat. The necessary prerequisite is that the glasses used exhibit adequate infrared absorption.

The heating of the glasses by means of directly radiating heat conductors occurs, preferably, between 1.1 and 1.8 µm. at a very high efficiency. As a result, the heat-up times of such heat-absorbent glasses can, compared to non-heat-absorbing glasses of identical toughness, be reduced quite substantially or, respectively, it is possible to perform sealing-in operations for identical periods at substantially lower heat output. As far as the life of the heat conductors are concerned, this is an advantage that deserves attention. These glasses afford another advantage due to the possibility of executing sealing-in processes under extremely clean working conditions, e.g., under protective gas, an oxidizing, reducing or neutral atmosphere, or else under a vacuum.

In the case of many heat conductors the maximum of the radiated energy is between 1 and 2 µm. It is in this range that the absorption of these sealing glasses reaches a maximum. This can most readily be seen from the transmission characteristics of the glasses which must exhibit a permeability minimum at these wave lengths.

Such a minimum at around 1.1 to 1.2 µm. can be achieved by the introduction of iron oxide. Depending on the composition of the base glass, one requires to this end admixtures of a few percent-by-weight of iron oxide. To achieve an elevated heat absorption, it is necessary that the iron ions be present in the divalent form. The glass batch may therefore not contain any oxidizing additions and is best melted in a neutral atmosphere. Occasionally, it is advantageous to introduce small amounts of reducing agents such as powdered charcoal or sugar. Sodium chloride or ammonium chloride are suitable as refining agents.

If the iron oxide is replaced in part by cobalt oxide, the transmission minimum can be enlarged from 1.1 to 1.8 µm. As a result, such glasses are given a broader range for the application of heat conductors with a maximum radiated energy between 1 and 2 µm.

The infrared absorbing seal-in glasses hitherto known in the art, e.g. from the French Pat. 1,451,798, are glasses rich in lead oxide with lead oxide contents in excess of 20 percent by weight and iron oxide admixtures of 2–6 percent by weight. They are derived from the so-called lead base glasses that have been known for a long time and that contain about 30 percent by weight lead oxide, which are being used in the electrical engineering field, e.g. for the manufacture of vacuum bases and as electrically highly insulating "neck" glasses in the manufacture of black-and-white picture tubes.

In the case of such glasses rich in lead oxide it is possible that, in a reducing atmosphere, there will readily occur a separating of lead and hence a blackening, making the use of such glasses in electrical engineering applications intolerable in view of the fact that this is likely to result in current punctures. The glasses according to the instant invention are either free of lead oxide or else contain substantially less lead oxide than the hitherto known sealing glasses; their cost of production is lower and, with regard to toughness (Ew and $V_A$ temperatures) they offer a wider selection range thus making it possible to find a suitable glass for any application. As to their electric insulating capacity ($T_k$ 100 values), the glasses according to the invention are equivalent to the glasses rich in lead oxide that are known in the art (PbO>20 percent by weight) (No. 1, 2, 5, 6 of the table, infra), or even superior (No. 3, 4, 7, 8 of the table, infra).

The instant invention comprises compositions of infrared absorbing glasses for the radiation range of 1.0–2.0 µm., which, for the purpose of achieving the heat absorption contain either iron oxide by itself or else iron oxide and cobalt oxide, and which, depending on their content of lead oxide, fluoride, boric acid, aluminum oxide and oxides of the divalent elements, can be subdivided into 4 groups:

(1) Glass compositions that are free of lead oxide, contain a high amount of fluoride, and 9.9–10.8 percent by weight of boron oxide ($B_2O_3$), aluminum oxide, and barium oxide, taken together.

(2) Lead oxide containing glass compositions having a lead oxide content of 17 percent by weight, a low fluoride content, and contain 9.2–9.7% by weight in boron oxide ($B_2O_3$), aluminum oxide and zinc oxide, taken together.

(3) Lead oxide containing glass compositions that are free of fluoride and boric acid and that contain 15.1–15.70 percent by weight of lead oxide and 2.00 percent by weight of aluminum oxide.

(4) Lead oxide containing glass compositions that are free of fluoride, containing 14 percent by weight of lead oxide and 6.6–7.2 percent by weight of boron oxide ($B_2O_3$), aluminum oxide and barium oxide, taken together.

All glasses in accordance with the invention exhibit heat expansion coefficients of 91.5–94.9×10⁻⁷/° C. in the temperature range from 20 to 300° C. They can therefore be readily used with the initially mentioned metal alloys. The glasses containing iron oxide and no cobalt oxide are particularly well suited for use with heat conductors having a maximum radiated energy in the order of 1.1/1.2 µm., while the glasses containing iron and cobalt oxide permit the use with heat conductors with a maximum radiated energy between 1.1 and 1.8 µm.

The precursor oxide mixture can contain 1.5–3.5% by wt. of $Fe_3O_4$, and, where CoO is used, about 0.7–1.0 wt. percent thereof.

The table below lists 8 percursor glass compositions in accordance with the invention (in terms of percent by weight of the mixture) and shows their physical properties.

Thus, the table shows precursor oxide mixtures consisting essentially of:

| | Wt. percent |
|---|---|
| $SiO_2$ | 52.3–67.2 |
| $B_2O_3$ | 0–5.0 |
| $Al_2O_3$ | 1.2–2.0 |
| $Li_2O$ | 0.5–1.4 |
| $Na_2O$ | 3.5–4.5 |
| $K_2O$ | 11.3–13.0 |
| ZnO | 0–3.5 |
| BaO | 0–6.2 |
| PbO | 0–17.0 |
| $Fe_3O_4$ | 1.5–5.0 |
| CoO | 0–1.0 |
| F | 0–1.9 |

Further, there may also be present reducing agents such as 0.10 wt. percent of sugar as well as refining agents such as 0.05 wt. percent of NaCl or $NH_4Cl$.

The drawing represents the corresponding transmission characteristics of the glasses in the case of a layer thickness of 0.5 mm. The curve 1 represents the course of the transmission of glasses containing iron oxide and no cobalt oxide (Nos. 1, 3, 5, 7), and curve 2 the course of the transmission of the glasses containing iron and cobalt oxide (Nos. 2, 4, 6, 8).

PRECURSOR COMPOSITIONS (IN PERCENT/WT.) OF 8 INFRARED-ABSORBING SEALING GLASSES

| | No. 1 | No. 2 | No. 3 | No. 4 | No. 5 | No. 6 | No. 7 | No. 8 |
|---|---|---|---|---|---|---|---|---|
| Components: | | | | | | | | |
| $SiO_2$ | 67.20 | 67.20 | 52.30 | 52.30 | 61.80 | 61.80 | 58.30 | 58.30 |
| $B_2O_3$ | 2.50 | 2.50 | 5.00 | 5.00 | | | 3.00 | 3.00 |
| $Al_2O_3$ | 2.00 | 2.00 | 1.20 | 1.20 | 2.00 | 2.00 | 2.00 | 2.00 |
| $Li_2O$ | 0.50 | 0.50 | 1.40 | 1.40 | 0.60 | 0.60 | 0.60 | 0.60 |
| $Na_2O$ | 4.50 | 4.50 | 3.50 | 3.50 | 4.00 | 4.00 | 3.80 | 3.80 |
| $K_2O$ | 13.00 | 13.00 | 11.30 | 11.30 | 12.00 | 12.00 | 12.20 | 12.20 |
| ZnO | | | 3.00 | 3.50 | | | | |
| BaO | 5.40 | 6.20 | | | | | 1.60 | 2.20 |
| PbO | | | 17.00 | 17.00 | 15.10 | 15.70 | 14.00 | 14.00 |
| $Fe_3O_4$ | 3.00 | 1.50 | 5.00 | 3.50 | 4.50 | 3.00 | 4.50 | 3.00 |
| CoO | | 0.70 | | 1.00 | | 0.90 | | 0.90 |
| F | 1.90 | 1.90 | 0.30 | 0.30 | | | | |
| Sugar | 0.10 | 0.10 | 0.10 | 0.10 | 0.10 | 0.10 | 0.10 | 0.10 |
| $NH_4Cl$ | | | 0.50 | 0.50 | 0.50 | 0.50 | 0.50 | 0.50 |
| NaCl | 0.50 | 0.50 | | | | | | |
| Total | 100.60 | 100.60 | 100.60 | 100.60 | 100.60 | 100.60 | 100.60 | 100.60 |
| $\alpha \times 10^7$ (20–300° C./° C.) | 91.9 | 92.5 | 92.0 | 91.5 | 93.2 | 93.8 | 94.9 | 94.0 |
| $T_g$ (° C.); $\eta \sim 10^{13.5} P$ | 428 | 428 | 433 | 437 | 430 | 422 | 453 | 453 |
| $E_w$ (° C.); $\eta = 10^{7.6} P$ | 651 | 655 | 608 | 604 | 635 | 638 | 635 | 640 |
| $V_A$ (° C.); $\eta = 10^4 P$ | 965 | 965 | 873 | 878 | 1,025 | 1,017 | 931 | 940 |
| Density (g./ccm.) | 2.53 | 2.54 | 2.91 | 2.90 | 2.74 | 2.75 | 2.80 | 2.79 |
| $T_k$ 100 (° C.); $\rho = 10^8 \Omega.cm$ | 310 | 305 | 348 | 355 | 308 | 312 | 331 | 327 |

EXAMPLES 1 AND 2

Example 1 corresponds to the compositions (in percent by weight) of glass No. 1 in the table and Example 2 corresponds to the glass No. 6 of the table.

For the purpose of melting 100 kg. of glass, the following quantities of raw materials are fused, thoroughly blended, at 1440° C., and refined at 1460° C. Processing temperature is between 1150–1200° C. A ceramic crucible of 50 l. capacity is used. The pulverulent blend of raw materials is molten at 1440° C. within 5 hours. The melt is refined for 12 hours at 1460° C., thereafter, the melt is cooled with a cooling speed of about 50° C./h. to 1150° C., and tubes having a wall thickness of about 0.5 to 1.0 mm. are manually drawn from this melt. The tubes are allowed to cool to room temperature.

Example 1 (glass No. 1)

| | Kg. |
|---|---|
| Sand | 57.4 |
| Soda | 4.0 |
| Potash | 19.12 |
| Barium carbonate | 7.0 |
| Petalite | 11.6 |
| "Rasorit" | 3.8 |
| Sodium silicofluoride | 3.2 |
| Iron oxide (black) | 3.0 |
| Hydrate of alumina | 0.17 |
| Sugar | 0.1 |
| Sodium chloride | 00.5 |

Example 2 (glass No. 6)

| | Kg. |
|---|---|
| Sand | 52.45 |
| Soda | 6.9 |
| Potash | 17.65 |
| Minimum (red lead) | 16.1 |
| Petalite | 12.3 |
| Lithium carbonate | 0.18 |
| Iron oxide (black) | 0.3 |
| Cobalt oxide | 0.97 |
| Sugar | 0.1 |
| Ammonium chloride | 0.5 |

Production of sealed alloy elements of the type mentioned, with these glasses, using radiant heat, is carried out in the manner known in the art using radiant heat to cast the known similar combinations.

Herein μm. means one millionth part of a meter.

Rasorit is a commercially available sodium borate comprising about 30% by weight $Na_2O$ and about 66% by weight $B_2O_3$.

What is claimed is:

1. Silicate glass which is heat absorbing and electrically highly insulating and suitable for sealing of elements of nickel-chromium-iron and nickel-manganese-iron alloys, said glass having an expansion coefficient of 91.5–94.9×10⁻⁷/° C. in the range of 20–300° C. and containing divalent iron ions in an amount providing a high of infrared absorption between 1–2 μm., said glass corresponding to precursor oxide mixture consisting essentially of:

| | Wt. percent |
|---|---|
| $SiO_2$ | 52.3–67.2 |
| $B_2O_3$ | 0–5.0 |
| $Al_2O_3$ | 1.2–2.0 |
| $Li_2O$ | 0.5–1.4 |
| $Na_2O$ | 3.5–4.5 |
| $K_2O$ | 11.3–13.0 |
| ZnO | 0–3.5 |
| BaO | 0–6.2 |
| PbO | 0–17.0 |
| $Fe_3O_4$ | 1.5–5.0 |
| CoO | 0–1.0 |
| F | 0–1.9 |

2. Glass according to claim 1, said precursor oxide mixture further containing 0.10 wt. percent of sugar, and 0–0.5 wt. percent of NaCl or $NH_4Cl$.

3. Glass according to claim 2, and free of lead.

4. Glass according to claim 2, having a maximum infrared absorption at about 1.1–1.2 μm.

5. Glass according to claim 2, containing cobalt oxide providing with the iron oxide a maximum infrared absorption in the range of about 1.1–1.8 μm.

6. Sealing glasses according to claim 2, corresponding to a precursor mixture containing about 1.5–3.5 percent by weight $Fe_3O_4$ and about 0.7–1.0 percent by weight CoO.

7. Sealing glasses according to claim 2, corresponding to a precursor oxide mixture containing in percent by weight: 67.20% $SiO_2$, 2.50% $B_2O_3$, 2.00% $Al_2O_3$, 0.50% $Li_2O$, 4.50% $Na_2O$, 13.00% $K_2O$, 5.40% BaO, 3.00% $Fe_3O_4$, 1.90% F, 0.10% sugar, 0.50% NaCl.

8. Sealing glasses according to claim 2, corresponding to a precursor oxide mixture containing in percent by weight: 67.20% SiO, 2.50% $B_2O_3$, 2.00% $Al_2O_3$, 0.50% $Li_2O$, 4.50% $Na_2O$, 13.00% $K_2O$, 6.20% BaO, 1.50% $Fe_3O_4$, 0.70% CoO, 1.90% F, 0.10% sugar, 0.50% NaCl.

9. Sealing glasses according to claim 2, corresponding to a precursor oxide mixture containing in percent by weight: 52.30% $SiO_2$, 5.00% $B_2O_3$, 1.20% $Al_2O_3$, 1.40% $Li_2O$, 3.50% NaO, 11.30% $K_2O$, 3.00% ZnO, 17.00% PbO, 5.00% $Fe_3O_4$, 0.30% F, 0.10% sugar, 0.50% $NH_4Cl$.

10. Sealing glasses according to claim 2, corresponding to a precursor oxide mixture containing in percent by weight: 52.30% $SiO_2$, 5.00% $B_2O_3$, 1.20% $Al_2O_3$, 1.40% $Li_2O$, 3.50% $Na_2O$, 11.30% $K_2O$, 3.50% ZnO, 17.00% PbO, 3.50% $Fe_3O_4$, 1.00% CoO, 0.30% F, 0.10% sugar, 0.50% $NH_4Cl$.

11. Sealing glasses according to claim 2, corresponding to a precursor oxide mixture containing in percent by weight: 61.80% $SiO_2$, 2.00% $Al_2O_3$, 0.60% $Li_2O$, 4.00% $Na_2O$, 12.00% $K_2O$, 15.10% PbO, 4.50% $Fe_3O_4$, 0.10% sugar, 0.50% $NH_4Cl$.

12. Sealing glasses according to claim 2, corresponding to a precursor oxide mixture containing in percent by weight: 61.80% $SiO_2$, 2.00% $Al_2O_3$, 0.60% $Li_2O$, 4.00% $Na_2O$, 12.00% $K_2O$, 15.70% PbO, 3.00% $Fe_3O_4$, 0.90% CoO, 0.10% sugar, 0.50% $NH_4Cl$.

13. Sealing glasses according to claim 2, corresponding to a precursor oxide mixture containing in percent by weight: 58.30% $SiO_2$, 3.00% $B_2O_3$, 2.00% $Al_2O_3$, 0.60% $Li_2O$, 3.80% $Na_2O$, 12.20% $K_2O$, 1.60% BaO, 14.00% PbO, 4.50% $Fe_3O_4$, 0.10% sugar, 0.50% $NH_4Cl$.

14. Sealing glasses according to claim 2, corresponding to a precursor oxide mixture containing in percent by weight: 58.30% $SiO_2$, 3.00% $B_2O_3$, 2.00% $Al_2O_3$, 0.60% $Li_2O$, 3.80% $Na_2O$, 12.20% $K_2O$, 2.20% BaO, 14.00% PbO, 3.00% $Fe_3O_4$, 0.90% CoO, 0.10% sugar, 0.50% $NH_4Cl$.

References Cited
UNITED STATES PATENTS

| | | | |
|---|---|---|---|
| 2,688,560 | 9/1954 | Armistead | 106—52 |
| 2,748,006 | 5/1956 | Kreidl et al. | 106—54 |
| 3,094,423 | 6/1963 | Davis | 106—54 |
| 3,326,703 | 6/1967 | Harrington | 106—52 |
| 3,445,256 | 5/1969 | Dalton | 106—53 |

TOBIAS E. LEVOW, Primary Examiner

M. L. BELL, Assistant Examiner

U.S. Cl. X.R.

106—53, 54

UNITED STATES PATENT OFFICE
CERTIFICATE OF CORRECTION

Patent No. 3,672,919      Dated June 27, 1972

Inventor(s) WERNER SACK

It is certified that error appears in the above-identified patent and that said Letters Patent are hereby corrected as shown below:

Col. 4, line 9, "0.3" should be --3.0--

Claim 8, line 3, "SiO" should be --$SiO_2$--

Claim 9, line 4, "NaO" should be --$Na_2O$--

Signed and sealed this 17th day of October 1972.

(SEAL)
Attest:

EDWARD M. FLETCHER, JR.
Attesting Officer

ROBERT GOTTSCHALK
Commissioner of Patents